(12) United States Patent
Coletti et al.

(10) Patent No.: US 11,882,502 B2
(45) Date of Patent: Jan. 23, 2024

(54) SYSTEM FOR MONITORING FLOWS OF PEOPLE WITHIN A PREDETERMINED AREA

(71) Applicant: G-MOVE SOCIETA' COOPERATIVA A R.L., Florence (IT)

(72) Inventors: Gabriele Coletti, Florence (IT); Marco Giunti, Vinci (IT); Marco Merlini, Florence (IT); Marco Musumeci, Florence (IT); Davide Nesi, Florence (IT); Federico Palai, Sesto Fiorentino (IT)

(73) Assignee: G-MOVE SOCIETA' COOPERATIVA A R.L., Florence (IT)

( * ) Notice: Subject to any disclaimer, the term of this patent is extended or adjusted under 35 U.S.C. 154(b) by 0 days.

(21) Appl. No.: 18/002,558

(22) PCT Filed: Jul. 26, 2021

(86) PCT No.: PCT/IT2021/050229
§ 371 (c)(1),
(2) Date: Dec. 20, 2022

(87) PCT Pub. No.: WO2022/034621
PCT Pub. Date: Feb. 17, 2022

(65) Prior Publication Data
US 2023/0239659 A1    Jul. 27, 2023

(30) Foreign Application Priority Data

Aug. 10, 2020  (IT) .................. 102020000019864

(51) Int. Cl.
*H04W 4/029* (2018.01)
(52) U.S. Cl.
CPC ................. *H04W 4/029* (2018.02)

(58) Field of Classification Search
CPC ............... H04W 4/029; H04L 2209/30; H04L 2209/42; H04L 9/0637; H04L 9/50; H04L 9/14; H04L 63/0421
See application file for complete search history.

(56) References Cited

U.S. PATENT DOCUMENTS 9,936,357 B2 *   4/2018   Mills .................. G06Q 30/0261
11,151,611 B2 * 10/2021   Korver .................... H04W 4/02
(Continued)

OTHER PUBLICATIONS

International Search Report and Written Opinion dated Sep. 13, 2021, in corresponding International Application No. PCT/IT2021/050229, 11 pages.
(Continued)

*Primary Examiner* — Alina A Boutah
(74) *Attorney, Agent, or Firm* — Maier & Maier, PLLC (57) ABSTRACT

A system for monitoring flows of people inside a predetermined area includes at least one receiving unit with at least one antenna adapted to receiving identification data transmitted by mobile communication devices present in a monitored area, the receiving unit also provided with a device for processing the data collected by the antenna; a processing unit programmed to perform statistical processing of the data collected by the antenna and processed by the respective processing device; and a data transmission network which connects the at least one receiving unit with the statistical data processing unit. Additionally, the processing device which receives the data collected by the antenna is programmed to perform an anonymization process with compression of the data, such that the data transmitted on the data transmission network are data that cannot be related back to the individual mobile devices that have generated them.

3 Claims, 4 Drawing Sheets (56) References Cited

U.S. PATENT DOCUMENTS

| | | |
|---|---|---|
| 2010/0312706 A1 | 12/2010 | Combet et al. |
| 2011/0110515 A1 | 5/2011 | Tidwell et al. |
| 2011/0159861 A1* | 6/2011 | Pratt .................... H04W 12/02 |
| | | 455/417 |
| 2015/0019322 A1* | 1/2015 | Alla ................... G06Q 30/0269 |
| | | 705/14.41 |
| 2016/0285981 A1* | 9/2016 | Morton ................ H04W 4/021 |
| 2017/0148063 A1* | 5/2017 | Ung .................... G06Q 50/163 |
| 2017/0150325 A1* | 5/2017 | Mills ..................... H04W 12/08 |
| 2019/0026492 A1 | 1/2019 | Sandholm et al. |
| 2019/0172096 A1 | 6/2019 | Tenant de la Tour et al. |
| 2019/0244498 A1* | 8/2019 | Dumas ............. G08B 13/19656 |

OTHER PUBLICATIONS

Kulshrestha Tarun et al., "An Improved Smartphone-Based Non-Participatory Crowd Monitoring System in Smart Environments", 2017 IEEE International Conference On Computational Science and Engineering (CSE) and IEEE International Conference On Embedded and Ubiquitous Computing (EUC), IEEE, vol. 2, Jul. 21, 2017 (Jul. 21, 2017), pp. 132-139, 8 pgs.

* cited by examiner

SYSTEM FOR MONITORING FLOWS OF PEOPLE WITHIN A PREDETERMINED AREA

FIELD

The present invention relates to a system for monitoring flows of people in a predetermined area.

BACKGROUND

The use of sensors is known for detecting the presence of people in a monitored area in order to monitor and control the flows of people in different zones of the monitored area.

These systems are used for economic or commercial purposes, to identify the preferences of costumers and to increase the attractiveness of certain products or services or displaying positions through the study of the detected flows, or for security purposes, for example for monitoring the number of accesses and presences in a specific area subjected to monitoring.

Systems are also known for monitoring flows of people configured for capturing from signals emitted by mobile devices, especially smartphones, of people present in a determined area, such as a shop, an exhibition space or an events space, a restaurant or a bar. These systems make use of the continuous attempt of mobile devices equipped with an active wireless network circuit to establish a connection with a network available and active in the monitored area; in this way, the mobile devices transmit, to a receiving unit of the network, searching data also containing identification codes of the mobile devices themselves, known as Media Access Control (MAC) address. The data thus collected are then sent to a processing unit that is programmed for tracking the number of people present at a given time, as well as over a period of time, within the monitored area, and performing statistical processing of the data received.

For example, the data are processed to identify the paths of the people moving in the monitored area. The aggregated data can show which parts of the monitored area are the most crowded parts, at what times and how the paths vary in response to random or intentional events determined by the person who manages the monitored area. Typically, the aggregated data can be used to determine the crossing times within the monitored area or to identify the most crowded points of the latter, also for maximizing the visibility of advertising or information displays or panels.

US 2011/0110515 discloses a methods and apparatus for collection and processing of data relating to users of a content-delivery network. In one embodiment, the content delivery network is a cable or satellite or HFCu network, and the apparatus includes an architecture for routinely harvesting, parsing, processing, and storing data relating to the activities of the users (e.g., subscribers) of the network. In one variant, at least portions of the data are anonymized to protect subscriber privacy. The anonymization process disclosed in US2011/0110515 keeps a one-to-one relationship between the original data and the processed data.

US 2010/0312706 discloses a method for collecting Internet and e-commerce data accessed via messaging devices such as mobile terminals that comprises monitoring packet traffic in a communication system providing communication services to the messaging devices and extracting network data from packets associated with respective device users. The portion of extracted network data from which a user's identity might otherwise be determined is encrypted, creating an anonymized, unique identifier correlated to network access data extracted from any packet traffic applicable to that user. Network access data associated with each user is distinguishable from network access data associated with all other users on the basis of the unique identifier. A third party granted access to the anonymized network access data, associated with identifiably unique but anonymous users of the communication system, may retrieve and store the data in a database for analysis. Anonymized network access data associated with those users electing to become voluntary participants is correlated, solely on the basis of the anonymized unique identifier, to socio-demographic data furnished by such participants. The anonymization process disclosed in US 2010/0312706 also keeps a one-to-one relationship between the original data and the processed data.

US 2019/0172096 discloses a technique for passively monitoring the number of guests in a rental property. Mobile device broadcasts intended for connecting the device to a wireless network contain information about that device. This information includes unique identifiers such as the MAC addresses. However, the technique disclosed in US 2019/0172096 uses a hashing process that provide invertible results, i.e. an unsafe data anonymization.

A drawback of these known systems is due to the fact that the data captured by the receiving unit and transmitted to the processing unit are subjected to processes that do not interrupt the one-to-one correspondence and the invertibility of the data which therefore can be related to the mobile device that have sent them. Therefore, it is possible to trace back the MAC address of the detected devices on the basis of the data that they transmit to the network.

SUMMARY

A system according to the present invention aims at overcoming the drawbacks described above.

This result has been achieved, in accordance with the present invention, by providing a system having the features indicated in claim 1. Other features of the present invention are the subject of the dependent claims.

Thanks to the present invention, it is possible to interrupt the invertibility and the one-to-one correspondence between the data captured by the receiving units and the data transmitted to the unit which processes them, thus avoiding the traceability of the data to the mobile devices that originated them and offering a very high level of security of data transmission. Further advantages derive from the fact that a monitoring system in accordance with the present invention requires a relatively low computational capacity of the devices used for implementing the system, which entails further advantages in terms of implementation costs. Furthermore, a system in accordance with the present invention offers further advantages, including: better management of the monitored areas and the events that take place inside the monitored areas, through the analysis of the collected data which are representative of phenomena such as crowding in particular points of the monitored areas and therefore better management of crowding both for reducing it (for example for safety reasons or for health reasons) and for commercially exploiting it (for example, for positioning a particular product or one or more advertising displays or boards at the most crowded points). This allows, in particular, a better exploitation of the monitored spaces, increasing their productivity and, at the same time, improving the so-called "user experience", i.e. the combination of perceptions and reactions that a person experiences when dealing with a product or a service.

BRIEF DESCRIPTION OF THE DRAWINGS

These and further advantages and characteristics of the present invention will be more and better evident to every person skilled in the art thanks to the following description and to the annexed drawings, provided by way of example but not to be considered in a limiting sense, in which.

DETAILED DESCRIPTION OF THE EMBODIMENTS

Figure 1:
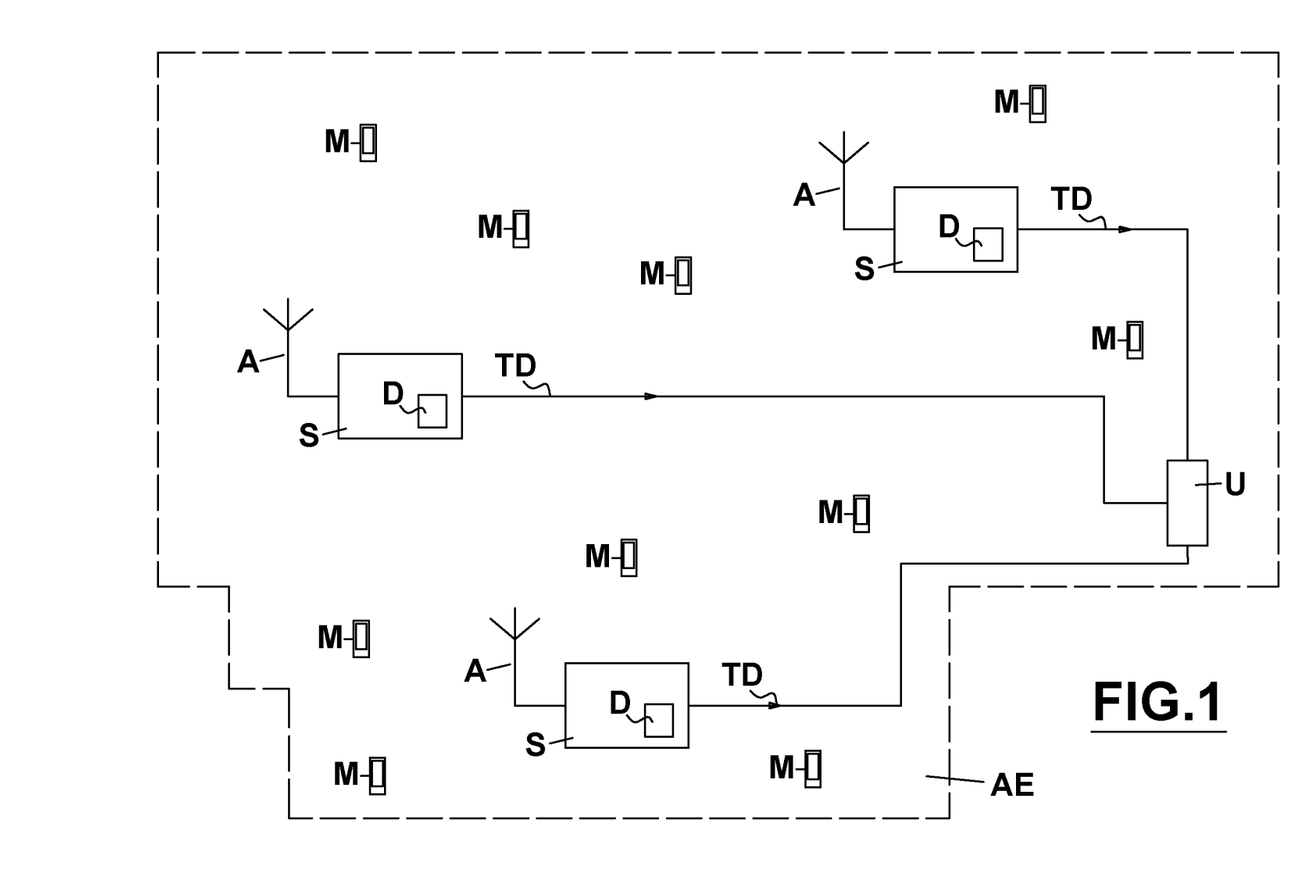
FIG. 1 is a simplified block diagram showing a possible way of implementing a monitoring system in accordance with the present invention.

Reduced to its essential structure and with reference to the annexed illustrative drawings, a monitoring system in accordance with the present invention comprises:
- at least one receiving unit (S) comprising at least one antenna (A) adapted for receiving identification data transmitted over a wireless network from mobile communication devices "M" (for example, of the smartphone or tablet type) present in a monitored area (AE) wherein the antenna (A) is positioned, said receiving unit (S) being also provided with a device (D) for processing the data detected by the antenna itself;
- a statistical data processing unit (U) programmed for performing statistical processing of the data detected by said antenna (A) and processed by the respective processing device (D);
- a data transmission network (TD) that connects the at least one receiving unit (S) with said statistical data processing unit (U).

In accordance with the present invention, the processing device (D), which receives the identification data captured by the antenna (A), is programmed to carry out an anonymization process with compression of the identification data, such that the data transmitted through the network (TD) are data that cannot be traced back to the individual mobile devices (M) that have generated them.

Preferably, the antenna (A) is shielded at a rear side thereof by a metal plate in order to prevent the receiving unit (S) from capturing data from mobile devices (M) outside the monitored area (AE). In other words, preferably, the receiving unit (S) receives data only from the monitored area. Preferably, the antenna (A) and said data processing device (D) connected to it are assembled as a single physical unit.

Preferably, the network (TD) connecting the at least one receiving unit (S) and the statistical data processing unit (U) is a wireless transmission network.

Alternatively, said network can be a wired network or a mixed network that is partly wired and partly wireless.

The receiving unit (S) can also be equipped with an internal memory capable of storing the data processed by the processing device (D) in case of a temporary malfunction or unavailability of the network (TD).

The data processed by the processing device (D) and destined to the statistical data processing unit (U) are transmitted through said network (TD). The system can be equipped with a status LED to show the operating status of the receiving unit (S), not shown in the drawings.

The system, with known methods, uses the connection that is normally established between a mobile device (M) in active wireless connection mode and an available wireless network if the mobile device is not already connected to other networks. Basically, the mobile device sends search data to establish a connection with the available wireless network, including its MAC address. In accordance with the present invention, the MAC address of each mobile device present in the monitored area (AE), area covered by the available wireless network, is received by the antennas (A) of the receiving units positioned in the monitored area (AE). This data, suitably processed by the processing device (D), is then transmitted to the processing unit (U) through the data transmission network (TD). The methods of acquiring the MAC addresses of the mobile devices (M) present in the area (AE) are known to those skilled in the art and therefore they are not further described.

In accordance with the present invention, the processing device (D) of the receiving unit (S) is a device programmed for processing each MAC address according to a processing program intended to eliminate any invertibility and one-to-one relationship between the data received through the respective antenna (A) and the data transmitted through the network (TD) which connects the receiving unit (S) with the statistical processing unit (U). In this way, the data received and subsequently processed by the statistical processing unit (U) cannot be traced back to the individual MAC addresses detected through the antennas (A).

Figure 2:
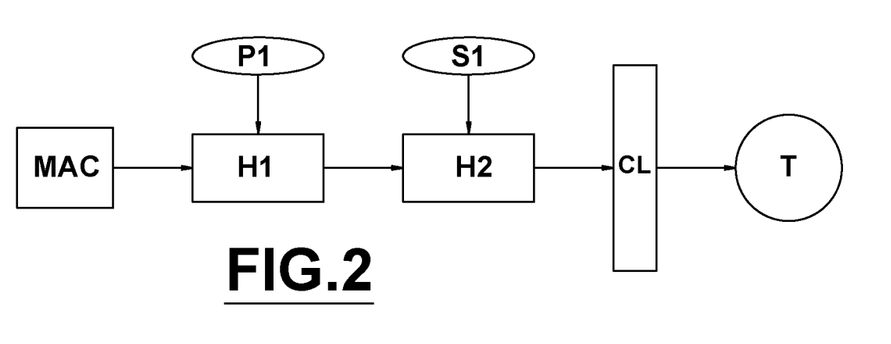
FIG. 2 is a simplified block diagram relating to a possible data processing method by a device (D) of a receiving unit (S) of the system schematically represented in FIG. 1.

For example, with reference to the diagram shown in FIG. 2, an antenna (A) captures the MAC address of a mobile device (M) within the monitored area (AE) and transmits it to the processing device (D) to which the same antenna is connected, and the processing device (D) is programmed to process this MAC address according to a sequence of processing phases comprising:
I. a first hashing phase (H1) with the addition of a cryptographic key (P1) that is the same for all the receiving units (S) and is secret.
II. a second hashing phase (H2) with the addition of a unique cryptographic key (S1) generated in a pseudo-random way.
III. a phase (CL) of compression and grouping (clustering) of the results produced by the double hashing, so that the space of the possible results of phase II is aggregated into a space of several orders of magnitude lower than the starting MAC addresses, thus producing an aggregated output data or "token" (T), such that there is never a one-to-one correspondence between the starting MAC address and the generated token and, vice versa, a large group of possible MAC addresses corresponds to one token.
IV. transmission of the data (T) produced by the clustering (i.e. the token) through the connection network (TD) to the statistical processing unit (U).

Figure 3:
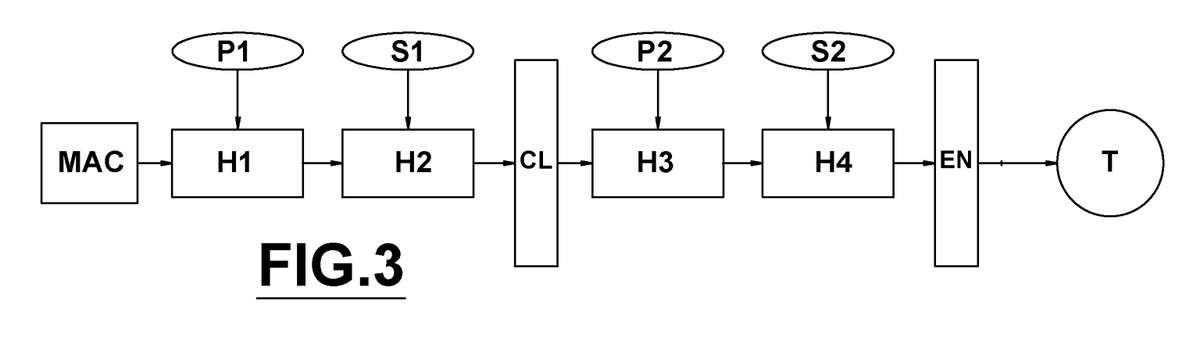
FIG. 3 is a simplified block diagram relating to a further possible data processing method by said device (D) and said receiving unit (S)

Preferably, with reference to the illustrative scheme of FIG. 3, the data generated by the clustering phase (CL) is subjected to a third and a fourth hashing phase (H3, H4) using other two corresponding cryptographic keys (P2, S2)

before being transmitted through the network (TD). Furthermore, preferably, the data resulting from the third and fourth hashing phase is subjected to an asymmetric encryption phase (EN), after which the data (T) thus obtained (token) is transmitted to the statistical processing unit (U) through the network (TD). It goes without saying that the statistical processing unit (U) is programmed to decrypt the received data. Furthermore, the asymmetric encryption (EN) can also be implemented between the aforementioned phases III and IV.

In more general terms, the processing device (D) is programmed to process each MAC address according to a sequence of processing phases that includes:
- a multiple hashing phase (H1; H2) with the addition of a corresponding cryptographic key (P1; S1);
- a phase (CL) of compression and grouping of the results produced by said multiple hashing phase (H1, H2), so that the space of the possible results of the previous phase is aggregated into a space of several orders of magnitude lower than that of the MAC starting address, producing an aggregate output data (token), such that there is never a one-to-one correspondence between the starting MAC and the generated token and that, on the contrary, a large group of possible MACs corresponds to one token.
- transmission of the data (T) produced by the clustering (token) through the connection network (TD) to the statistical processing unit (U).
- and, preferably, the data generated by the clustering phase (CL) is subjected to at least one further hashing phase (H3; H4) with a corresponding at least one further cryptographic key (P2; S2) before being transmitted through the network (TD).

Said cryptographic keys (P1, S1, P2, S2) are cryptographic keys whose structure and function are known per se in the context of hashing cryptography.

The hashing phases that precede the compression phase (CL) can be more than two in cascade (for example, three in number). Similarly, the hashing phases that, in the preferential mode of implementation of the invention, follow the compression phase (CL) can be more than two in cascade (for example, three in number).

The system described above implements a non-invertible mathematical process breaking any one-to-one relationship between the original data and the output data produced by the processing device (D) thanks to the aggregation produced in the phase (CL) of compression and clustering of the results of the hashing phases (H1, H2). According to the example described above, two arbitrary keys (P1, P2) are used. The non-invertibility of the process is further enhanced by executing the hashing phases (H3) and (H4).

The following description provides an example of practical implementation of the invention, with particular reference to the hashing and clustering phases of a MAC address as disclosed above.
a) the MAC address captured by an antenna (A) is, for example, "af:21:i5:f9:p1:e2"
b) the first hashing (H1) uses the key (P1) defined in this example as "lachiavepepper1" concatenated in suffix mode to the MAC address "af21:i5:f9:p1:e2" thus obtaining "af:21:i5:f9:p1:e2lachiavepepper1" which is subsequently hashized obtaining the string "9f86d081884c7d659a2feaa0c55ad015a3bf4f1b2b0b822cd15d6c15b0f00a08". This string is the product of a hashing procedure with key, therefore it is difficult to invert but it is still in a one-to-one correspondence with the original MAC address. The key "lachiavepepper1" is arbitrary, and it is the same for all the receiving units (S) arranged in a same monitored area.
c) The string "9f86d081884c7d659a2feaa0c55ad015a3bf4f1b2b0b822cd15d6c15b0f00a08" is processed by the second hashing function (H2) which has, as input, the result string of the first hashing procedure (H1) concatenated to the string (key S1) "lachiavesalt1", resulting in the string "8e3923723d8b83e7f8c2d00c57c3f00e43c67d7be0bcd9bded3b13c3129ba6f2". The result of this phase is a computationally non-invertible string even if it is still in a one-to-one correspondence with the MAC address. The key "lachiavesalt1" is a key obtained with a pseudorandom process whose seed is the string resulting from point b). The key (S1) is always the same for all the receiving units (S) of a same monitored area, given the same MAC address, but it is different for different monitored areas (the pepper1 key is different for different monitored areas) or different MAC addresses (technical feature) and in any case provides a non-invertible and random value.
d) the string "8e3923723d8b83e7f8c2d00c57c3f00e43c67d7be0bcd9bded3b13c3129ba6f2" is now processed by the clustering function (CL) which reduces its dimension. This step can be carried out in different ways, the most immediate of which consists, by way of example, in removing characters from the input string to produce the output string. For example, starting from the string "8e3923723d8b83e7f8c2d00c57c3f00e43c67d7be0bcd9bded3b13c3129ba6f2" a possible output is the string "8e3923723d8b83e7f8c2d00c57c3f00e4". The extent of the "truncation" performed defines the aggressiveness of the clustering step. The more aggressive the clustering step, the greater the number of MAC addresses converging to a same token (T). The validity and homogeneity of the clustering is given by the homogeneity and the inherent unpredictability of the hashing function (the strings produced by clustering are associated with a number of MAC addresses that is statistically homogeneous, i.e. there are no tokens that correspond to a significantly larger number of existing mac addresses compared to other tokens). The string "8e3923723d8b83e7f8c2d00c57c3f00e4" produced by the example now described is no longer in a one-to-one correspondence with the MAC address that generated it because, for example, even the string "8e3923723d8b83e7f8c2d00c57c3f00e4partediversadallastringaoriginale" originates the output string "8e3923723d8b83e7f8c2d00c57c3f00e4". The string "8e3923723d8b83e7f8c2d00c57c3f00e4" is the result of clustering.
e) (preferable phase to achieve an additional level of security) at this point the string "8e3923723d8b83e7f8c2d00c57c3f00e4" is processed by a new hash function (H3) with cryptographic key (P2) having the value "Lachiavepepper2" and is used to generate a new string "Cd9c8f02a3cfe9d09a473916d85834a415458b9c2f1b5905505c829d721c140b". The concatenation procedure is identical to that disclosed at points b) and c). The result is in a one-to-one relationship with the previous string and is in a one-to-many relationship with the initial data (MAC address), that is computationally non-invertible with respect to the MAC address and even more difficult to invert with respect to the output of step d).

f) (step preferable to achieve an additional level of security) the string "cd9c8f02a3cfe9d09a473916d85834a415458b9c2f1b5905505c829d721c140b" is processed by a further hash function (H4) with cryptographic key (S2) that has the value "lachiavesalt2" to produce a new string "316624d8c3f9cfc8598c927d4c9bc1f48606632a732cf016ef22e91038496fba" through the hashing that is in a one-to-one relationship with the string resulting from the clustering procedure, but is in a one-to-many relationship with the MAC address. The result is computationally non-invertible. The key "lachiavesalt2" is a key obtained with a pseudorandom process that takes the string resulting from point e) as a seed. This key is always the same for the receiving units (S) of the same installation given the same mac but different for different installations or different macs (if different macs produce the same result after clustering, lachiavesalt2 will also be the same). However, the output result is non-invertible and random.

g) (optional phase, particularly suitable for the transmission of tokens on non-secure networks) the result of the previous phases is encrypted through a public/private key system. A public key is used "Public key of sensor342" that is specific for each receiving unit (S) that receives the string "316624d8c3f9cfc8598c927d4c9bc1f48606632a732cf016ef22e91038496fba" and transforms it into "a2835b0aa825390ad6872be041e01903e628af517b3f18906c4a89a3131cb504" that. is subsequently. transmitted to the statistical processing unit (U) using "lachiaveprivatadelsensore342" as a provate key related to the receiving unit (S) obtaining again the string "316624d8c3f9cfc8598c927d4c9bc1f48606632a732cf016ef22e91038496fba"

It is understood that, in more general terms, each device (D) is programmed to perform an anonymization phase with compression and grouping of the data received by the respective antenna (A) in order to avoid the traceability of the data transmitted on the network (TD) to data captured by the antennas (A), or data from mobile devices (M).

The tokens (T) transmitted to the unit (U) through the network (TD) can then be processed by the same unit (U) which is programmed to process them for statistical purposes. For example, the unit (U) can provide the number of people present in the monitored area (AE) and store the collected data, classifying them on an hourly, daily or weekly basis or on the basis of other time intervals. The unit (U) will therefore be able to produce, for example, graphs to highlight the trend of attendance in the chosen time base. Furthermore, since the unit (U) can store the received data, it will be possible to highlight a distinction between data (token) received in time periods prior to the period examined and data (token) related to MAC received by the antennas (A) for the first time that therefore they can be classified as new presences in the area (AE). In this regard, it should be noted that the processing unit (U) is programmed to classify as a new token (token generated by the MAC of a new detected user) any token not equal to a previously acquired token and, vice versa, to classify as already acquired a token equal to the token generated by the MAC of the mobile device (M) of a user previously detected in the area (AE), this in consideration of the fact that the probability that the same tokens are generated by different MACs is low, in relation to the compression procedure described above.

The statistical elaborations of the tokens (T) can be easily viewed in a dashboard through a monitor connected to the statistical processing unit (U) or even printed. The dashboard can be adapted to the type of area monitored (shop, exhibition space, space open to the public, etc.), and can also display key business indicators, generally known as KPIs, or Key Performance Indicators, of the customer as well as for example the repeat customer rate, the customer loyalty rate and the average time spent in the area.

Figure 4:
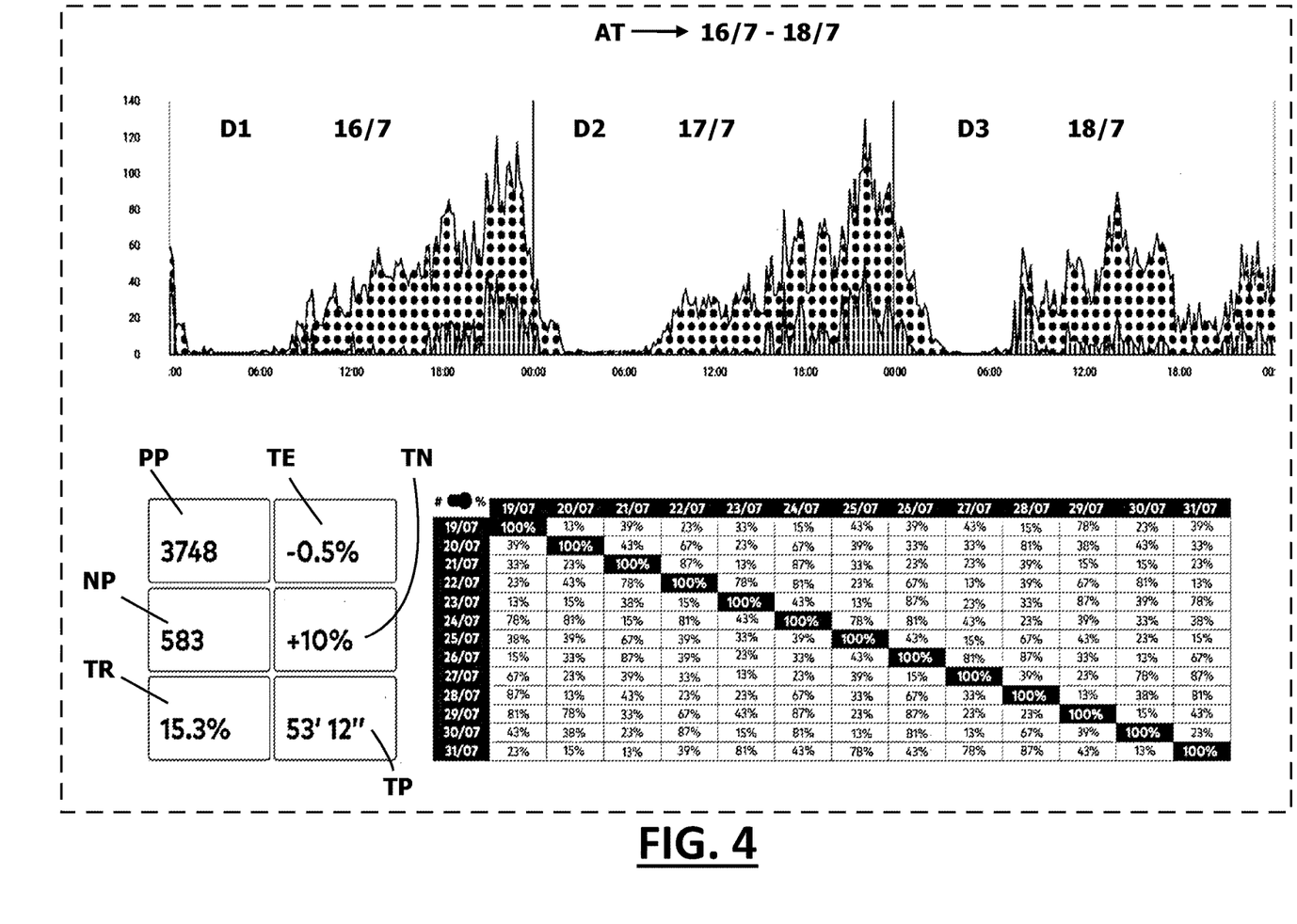
FIG. 4 represents a possible configuration of a dashboard with statistical processing of the tokens generated by monitoring the area concerned.

For example, FIG. 4 shows a possible configuration of a dashboard with statistical processing of the tokens generated by monitoring the area concerned, in which, in a given time span (AT), from example a period of time comprised between 16 July and 18 July of a given year, the number of people present (PP) in the monitored area and the number of new visitors (NP) or customers who had access to the monitored area are identified. In FIG. 4 are shown as Cartesian diagrams, in which the presences are shown on the ordinates and the times are shown on the abscissas, the hourly trends of presences. The dashboard shows a chart for each monitoring day (D1, D2, D3). In these graphs, the areas with circles pattern represent the cumulative presences, while the dashed areas represent the new presences. The dashboard shown by way of example in FIG. 4 also shows the average value of the detected time (TP) spent in the monitored area by each customer, as well as the return trend (TR), the attendance trend (TE) and the new customers trend (TN) which are representative of the improvement or worsening of the KPIs compared to a previous period of time.

In the example shown in FIG. 4 the variables mentioned above have the following values: PP=3748; NP=583; TR=15.3%; TE=−0.5%; TN=+10%; TP=53'12".

In the same dashboard there is also a table that shows, for a longer period of time (in the specific case of the example, the period between 19/07 and 31/07 of a given year) a correlation between the number of visitors o customers who accessed the monitored space and the return rate of the same visitors or customers on different days. For example, by crossing the data relating to the 21/7 column with the data relating to the 24/7 row, the figure of 15% that can be read in the table indicates a return rate of 15%. In other words, among all the people present in the area (AE) on 21/7, 15% of them returned on 24/7.

Figure 5:
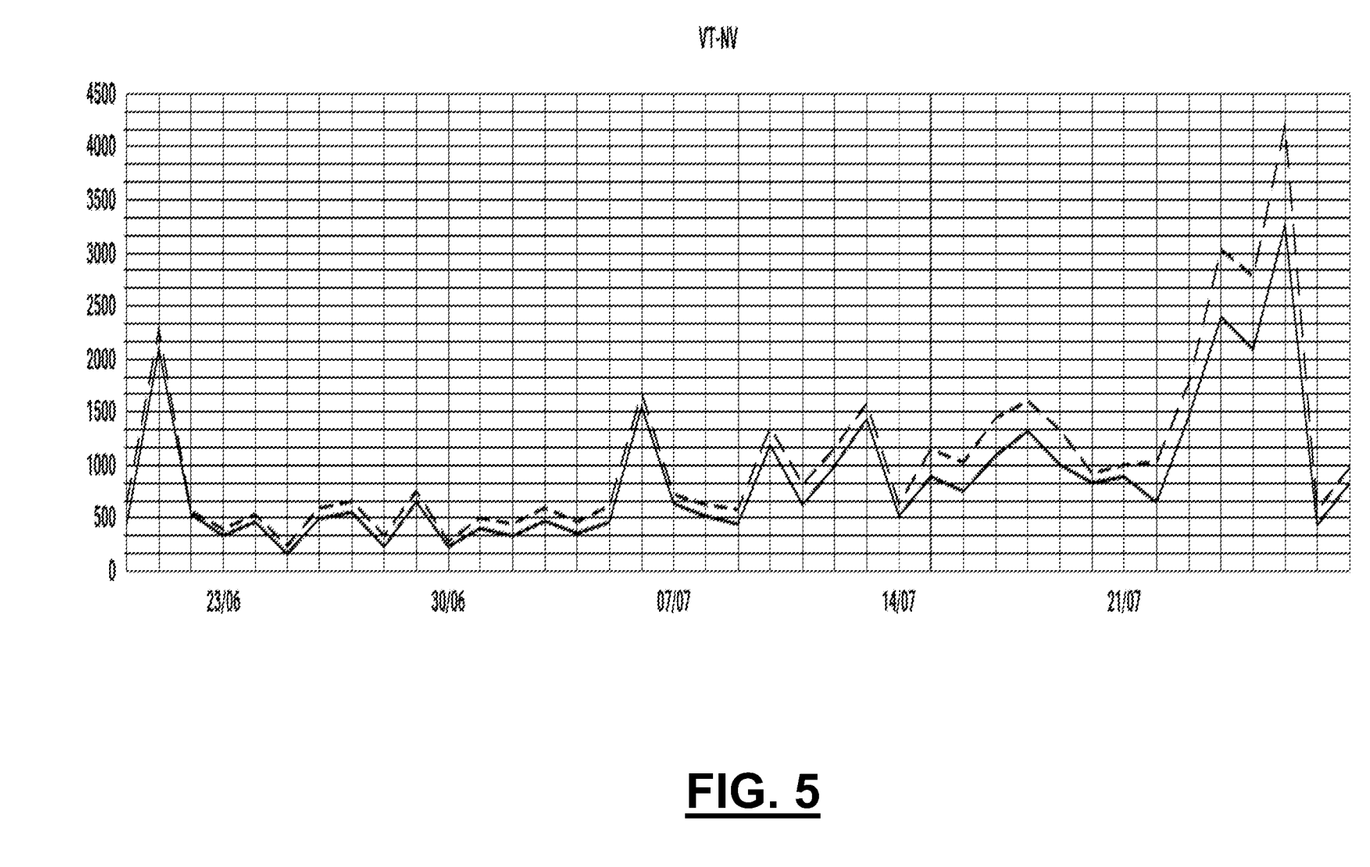
FIG. 5 represents a possible configuration of a periodic report of the collected data.

It is also possible to carry out periodic reports, as in FIG. 5 of the data collected to analyze the flows over a given period of time or to compare data relating to different periods, allowing to study the behavior of customers over time in correlation with external factors (weather, other events in the city, etc.), to compare the effectiveness (evaluated for example in terms of turnout, time spent, etc.) of different monitored spaces, such as different points of sale in a supermarket chain, or different attractions and events held in the same environment.

For example, FIG. 5 shows a summary graphic report referring to a specific time span divided into weeks from 20/6 to 28/7, in which the graphs are representative of the data contained in table 1 below. These graphs show the number of total visitors (VT) with a dashed line and the number of new visitors (NV) with a continuous line, from which the curiosity rate (TC) can also be obtained, i.e. the ratio between the number of new visitors and the total number of visitors expressed as a percentage, also reported in the table and in which the time is indicated in the abscissa.

TABLE 1

| Day | VT | NV | TC |
| --- | --- | --- | --- |
| 20/06 | 632 | 436 | 69.0% |
| 21/06 | 2279 | 2093 | 91.8% |

TABLE 1-continued

| Day | VT | NV | TC |
|---|---|---|---|
| 22/06 | 564 | 537 | 95.2% |
| 23/06 | 397 | 335 | 84.4% |
| 24/06 | 533 | 463 | 86.9% |
| 25/06 | 241 | 163 | 67.6% |
| 26/06 | 595 | 496 | 83.4% |
| 27/06 | 659 | 555 | 84.2% |
| 28/06 | 335 | 230 | 68.7% |
| 29/06 | 755 | 654 | 86.6% |
| 30/06 | 279 | 230 | 82.4% |
| 01/07 | 501 | 402 | 80.2% |
| 02/07 | 446 | 332 | 74.4% |
| 03/07 | 596 | 472 | 79.2% |
| 04/07 | 466 | 357 | 76.6% |
| 05/07 | 615 | 462 | 75.1% |
| 06/07 | 1685 | 1552 | 92.1% |
| 07/07 | 724 | 638 | 88.1% |
| 08/07 | 628 | 518 | 82.5% |
| 09/07 | 579 | 443 | 76.5% |
| 10/07 | 1352 | 1184 | 87.6% |
| 11/07 | 818 | 623 | 76.2% |
| 12/07 | 1160 | 993 | 85.6% |
| 13/07 | 1584 | 1436 | 90.7% |
| 14/07 | 629 | 518 | 82.4% |
| 15/07 | 1147 | 890 | 77.6% |
| 16/07 | 1026 | 753 | 73.4% |
| 17/07 | 1446 | 1092 | 75.5% |
| 18/07 | 1604 | 1322 | 82.4% |
| 19/07 | 1333 | 1003 | 75.2% |
| 20/07 | 924 | 834 | 90.3% |
| 21/07 | 1001 | 891 | 89.0% |
| 22/07 | 1029 | 654 | 63.6% |
| 23/07 | 1775 | 1455 | 82.0% |
| 24/07 | 3035 | 2400 | 79.1% |
| 25/07 | 2781 | 2092 | 75.2% |
| 26/07 | 4210 | 3268 | 77.6% |
| 27/07 | 576 | 435 | 75.5% |
| 28/07 | 977 | 830 | 85.0% |

It is also possible to create a map of the data collected over a certain period of time in a certain area as a heatmap in order to provide a further graphic representation of the data.

As can be seen from the aforementioned reports, the processed data are completely anonymized without any possibility for the user to trace them back to the detected MAC addresses of the individual mobile devices, all this without preventing the statistical processing of the data transmitted to the unit (U).

A monitoring system in accordance with the present invention was realized for testing purposes using the following components: for the receiving unit (S) a board with a 3D antenna already integrated in addition and a esp32 chip, namely the PicoKit, was used; for the processing of the data collected by the antenna, a Raspberry Pi Zero W 16 gb microsd, 0.5 gb ram board was used which also sends the processed data; the data transmission to the processing unit (U) was carried out via a network generated by a 2.4 GHz Access Point with internet access; the processing unit consisted of a general purpose server with 6 cores and 32 gigabytes ram, gigabit network card and 500 Gb of disk space.

From the foregoing description it is evident that a monitoring system in accordance with the present invention consists of a set of physical devices, including the receiving units (S), the antennas (A), the processing devices (D), the network (TD) and the unit (U), with the required wiring, some of which (in particular, the processing devices D and the statistical processing unit U) are programmable devices to process the radio signals picked up by the antennas (A) according to a sequence of operationally interconnected processing steps to perform the functions and achieve the objectives described above.

The statistical processing unit (U) may consist of a single machine or a plurality of machines connected to the network.

In practice, the details of execution can in any case vary in an equivalent way as regards the individual elements described and illustrated, without thereby departing from the idea of the solution adopted and therefore remaining within the limits of the protection conferred by this patent in accordance with the following claims.

The invention claimed is:

1. A system for monitoring flows of people, comprising:
at least one receiving unit provided with at least one antenna adapted to receiving identification data transmitted on a wireless network by mobile communication devices present in a monitored area in which the antenna is positioned, said receiving unit also provided with a device for processing data collected by said antenna;
a statistical data processing unit programmed to perform statistical processing of the data collected by said antenna and processed by the respective processing device; and
a data transmission network which connects the at least one receiving unit with said statistical data processing unit;
wherein
the processing device which receives the data collected by the antenna is programmed to perform an anonymization process with compression of the data, such that the data transmitted on the data transmission network are data that cannot be related back to the individual mobile devices that have generated them;
the identification data received by the antennas are MAC addresses of said mobile communication devices;
the device is programmed to process each MAC according to a sequence of processing phases, which involves:
I. a first hashing phase with the addition of a cryptographic key identical for all the receiving units and secret;
II. a second hashing phase with the addition of a pseudorandom unique cryptographic key (S1);
III. a phase of compression and grouping of the results produced by said two hashing phases, so that the space of possible results of phase II is aggregated producing a space several orders of magnitude lower than the starting MAC address, and producing an aggregate data output or token, such that there is never a one-to-one correspondence between each starting MAC and the token generated by it, and on the contrary, a token corresponds to a group of possible MAC addresses; and
IV. transmission of the aggregated data produced by the compression and grouping phase, through the network of connection to the statistical data processing unit.

2. The system according to claim 1, wherein the data generated by the compression and grouping phase are subject to a third and a fourth hashing phases using two other corresponding cryptographic keys before being transmitted through the network.

3. The system according to claim 1, wherein, before being entered on the transmission network, the data destined to the statistical data processing unit are encrypted.

* * * * *